United States Patent [19]
Sandt

[11] Patent Number: 5,405,668
[45] Date of Patent: Apr. 11, 1995

[54] COMPOSITE STRUCTURAL ELEMENT

[76] Inventor: Hartley Sandt, 2425 Dogwood La., Orange Park, Fla. 32073

[21] Appl. No.: 68,619

[22] Filed: May 25, 1993

Related U.S. Application Data

[60] Continuation of Ser. No. 615,144, Nov. 19, 1990, abandoned, which is a division of Ser. No. 138,151, Dec. 28, 1987, Pat. No. 5,004,574.

[51] Int. Cl.⁶ .................. B29D 22/00; B29D 23/00; F16F 1/06
[52] U.S. Cl. .................. 428/36.9; 428/34.5; 428/34.7; 428/35.6; 428/35.7; 428/36.3; 428/373; 428/375; 428/377; 428/378; 428/398; 267/166
[58] Field of Search ............... 428/373, 374, 378, 372, 428/370, 371, 34.1, 35.7, 36.9, 36.91, 36.4, 36.3, 392, 398, 375, 383, 393, 394; 267/166

[56] References Cited

U.S. PATENT DOCUMENTS

| | | | |
|---|---|---|---|
| 2,852,424 | 4/1957 | Reinhart et al. | 264/90 |
| 4,384,022 | 5/1983 | Fowler | 428/370 |
| 4,643,929 | 2/1987 | Watanabe et al. | 428/375 |
| 4,661,387 | 4/1987 | Watanabe et al. | 428/375 |
| 4,664,961 | 5/1987 | Vees et al. | 428/375 |
| 4,758,458 | 7/1988 | Schütze | 428/378 |
| 4,769,286 | 9/1988 | Le Noane | 428/372 |
| 4,770,778 | 9/1988 | Yokoyama et al. | 428/375 |
| 4,770,915 | 9/1988 | Nakagawa et al. | 428/375 |
| 4,772,502 | 9/1988 | Okura et al. | 428/373 |

FOREIGN PATENT DOCUMENTS

| | | | |
|---|---|---|---|
| 2082872 | 11/1971 | France . | |
| 2021347 | 11/1970 | Germany . | |
| 869163 | 5/1961 | United Kingdom | 428/36.4 |
| 933755 | 8/1963 | United Kingdom | 428/378 |

*Primary Examiner*—Patrick J. Ryan
*Assistant Examiner*—J. M. Gray
*Attorney, Agent, or Firm*—Arthur G. Yeager

[57] ABSTRACT

An elongated structural element having an outer tubular casing with the hollow interior space filled with a plastic binder containing a plurality of elongated parallel strands of fiber reinforcement material extending lengthwise of the element; and a method for preparing such an element by filling a preformed tubular casing with a plastic binder in liquid form dispersed in which are parallel strands of reinforcing fibrous material, and allowing the plastic binder to solidify.

19 Claims, 2 Drawing Sheets

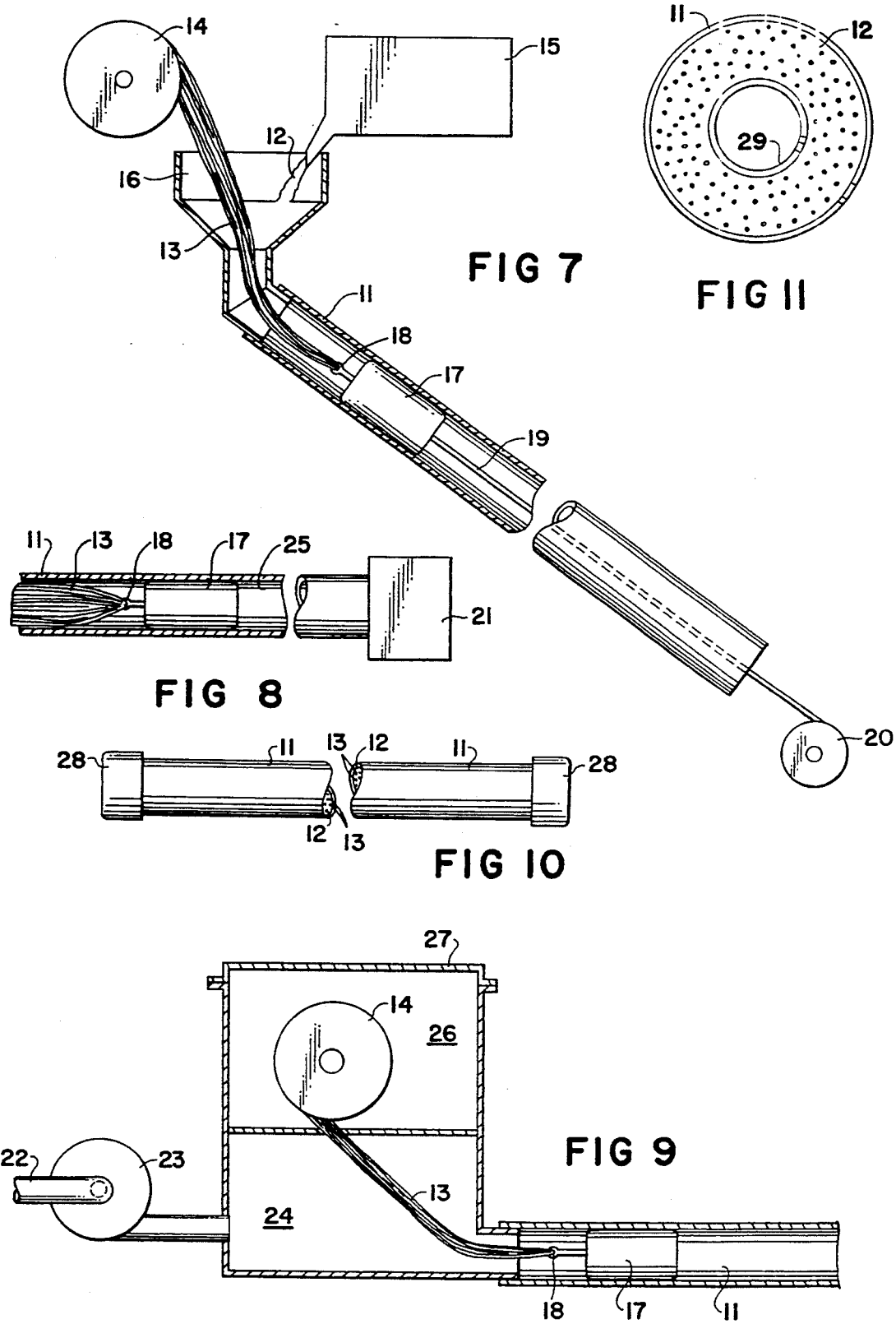

COMPOSITE STRUCTURAL ELEMENT

This is a continuation of application Ser. No. 07/615,144, filed on Nov. 19, 1990, now abandoned, which is a Divisional of 07/138,151, filed Dec. 28, 1987, and is now U.S. Pat. No. 5,004,574, issued Apr. 2, 1991.

BACKGROUND OF THE INVENTION

Structural elements such as rods, tubes, and beams are normally made by casting, extruding, or rolling techniques to produce plastic or metal tubing, sheets, rods, beams, and the like. These structural elements normally comprise a single material which is chosen for its combination of physical properties, e.g., strength and weight, as well as corrosion resistance, color, and texture. Plastic molding and extrusion procedures have provided the possibility of preparing plastic structural elements with selected combinations of physical properties, chemical properties, color, texture, etc. Fiber reinforcement of plastic materials has provided much higher physical strength properties than the plastic material alone could offer. In general, these fiber reinforced materials are made by extruding through a die a plastic melt having continuous strands of fiber distributed therein. The extrudate is then solidified in the form of a continuous rod, beam, or strand and can be cut into whatever length is desired for use. The disadvantages of the prior art procedures are (1) that the extrudate can not be made into a curved or non-linear article, and (2) the surface properties at the extrudate cannot be changed from that inherent in the extruded plastic.

It is an object of this invention to provide a novel structural element of fiber reinforced plastic material. It is another object of this invention to provide methods for manufacturing such structural elements. Still other objects will be apparent from the more detailed description which follows.

BRIEF SUMMARY OF THE INVENTION

This invention relates to a structural element comprising an elongated solid or tubular member having a substantially identical cross section over its entire length, the element having a solid core of thermoplastic or thermosetting resin embedded ill which is a plurality of substantially parallel elongated strands of lengthwise fiber reinforcement material and a continuous casing around the core of a plastic material.

This invention also relates to a process for preparing an elongated structural element comprising:

(1) preparing a hollow tubular solid casing of a flexible, semiflexible, or rigid material;
(2) filling the interior of the casing with a plastic material in liquid form;
(3) distributing throughout said plastic material a plurality of elongated strands of fiber reinforcement material substantially parallel to each other and extending lengthwise of the casing; and
(4) allowing the plastic material to solidify with the strands of fiber reinforcement material embedded therein.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 7 is a schematic illustration of one embodiment of the process of this invention;

FIG. 8 is a schematic illustration of a second embodiment of the process of tills invention;

FIG. 9 is a schematic illustration of a third embodiment of the process of this invention;

FIG. 10 is a schematic illustration of the structural element of this invention with end caps attached; and FIG. 11 is an end elevational view similar to FIG. 2 except to show a hollow form of the structural element of this invention.

DETAILED DESCRIPTION OF THE INVENTION

This invention relates to a novel article of manufacture which is shown in FIGS. 1-6 of the attached drawings, and to a process for preparing the article of manufacture which is shown in FIGS. 7-9.

Figure 1:
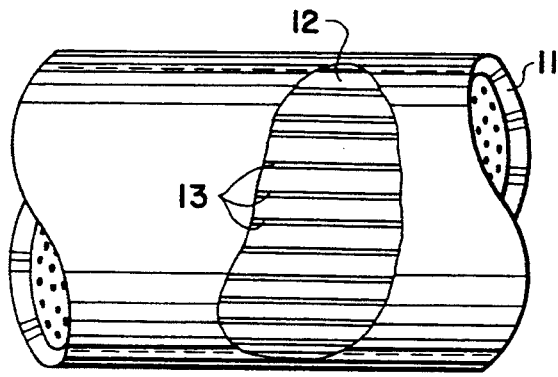
FIG. 1 is a side elevational view of one embodiment of the structural element of this invention.
Figure 2:
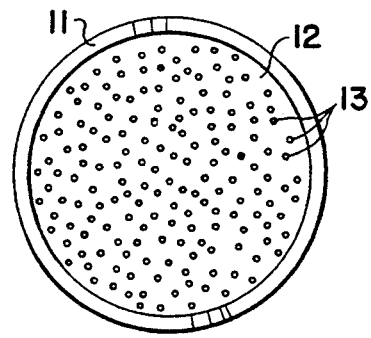
FIG. 2 is an end elevational view of the structural element of this invention in FIG. 1.

In FIGS. 1-6 there are depicted four types of structural elements employing this invention. In FIGS. 1-2 there is shown a cylindrical rod element having three components; namely, a casing 11, an internal binder 12, and strands 13 of fiber reinforcement material. These are all joined together into a single unitary structure which has an indefinite length and a substantially similar cross section at any place along that length.

Casing 11 is a flexible, semiflexible, or rigid pipe or tubing having whatever properties are important for the eventual use of the structural element. If corrosion resistance is important, casing 11 must provide that property; and so on for other property requirements. Generally, casing 11 should be a flexible or semiflexible thermoplastic material which is compatible with binder 12 and does not react chemically therewith. In other embodiments casing 11 may be a metallic tube, an animal or human vein, intestine, or the like. Preferably there is no bond between the two although in certain embodiments binder 12 and casing 11 may be bonded to each other. Typical materials for casing 11 include polyolefins, polyvinyls, polyesters, polyacetals, polyacrylics, polyamides, polyfluorocarbons, polycarbonates, and other plastics of similar properties, aluminum, human or animal tissue, and the like.

The internal space in casing 11 is filled with binder 12 and fiber reinforcement 13. Binder 12 must be capable of tightly adhering to strands 13. Preferably, binder 12 should be available in liquid form for ease in manufacturing the structural element of this invention, and capable of being transformed into solid form at ambient conditions for use as binder 13 in the structural element in ordinary use. Binder 13 may be a thermoplastic or a thermosetting material each of which exists in both liquid and solid forms. The thermoplastic materials normally change from liquid to solid and from solid to liquid by temperature changes. Thermosetting materials normally involve two or more starting components which are mixed together to produce a liquid which is hardened by chemical reaction between the components and cannot later be liquefied. Typical thermoplastics include polyolefins, polyesters, polyvinyls, polyacetals, polyacrylics, polyamides, polyfluorocarbons, polycarbonates, and the like. Typical thermosetting binders include phenol-formaldehyde resins, melamine resins, epoxy resins, urea-formaldehyde resins, polyesters, and the like.

The fiber reinforcement material 13 is a plurality of strands of fiber or filament that are distributed throughout the binder and are in substantially parallel arrangement running lengthwise of the structural element. The strands may be in a linear arrangement or in a sinuous or helical arrangement so long as they remain parallel to each other. Ideally, the strands 13 would be separated from each other and equally distributed throughout all of the binder 12. From a practical point or view this may not be achieved, but preferably, the strands are extended lengthwise throughout the structural element and distributed as evenly as possible in the binder. The strand 13 may be a single filament or a plurality of filaments twisted together, or may be a single fiber or a plurality of fibers twisted into a thread; or may be any other combination of fibers, filaments, threads, yarns or the like that are relatively small in diameter and relatively long in length. Tubular filaments, threads, yarns and the like are also useful as strands 13. The word "strand" herein is meant to be generic and to include all of the above configurations. The material of the strands may be organic or inorganic. The organic strands include materials such as cotton, wool, bagassee, hemp, polyamide, polyacrylonitril, polyester, rayon, and the like. Inorganic strands include materials such as glass, steel, copper, aluminum, titanium, and the like.

In order to assure good adhesion between the binder 12 and the strands 13, there may be employed certain promoters or agents to enhance the bonds between binder 12 and strands 13.

Figure 3:
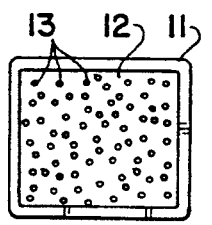
FIG. 3 is an end elevational view of a second embodiment of the structural element of this invention.
Figure 4:
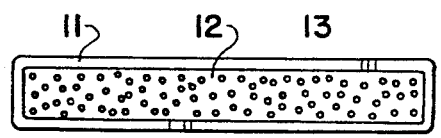
FIG. 4 is an end elevational view of a third embodiment of the structural element of this invention.
Figure 5:
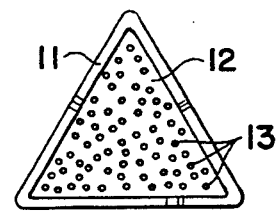
FIG. 5 is an end elevational view of a fourth embodiment of the structural element of this invention.

In FIGS. 3-5 there are shown other structural elements of other cross sectional shapes, e.g., square (FIG. 3), oblong (FIG. 4), and triangular (FIG.5), which may be solid as shown or internal open space as seen in FIG. 11. Still other shapes are within the scope of this invention since any geometric design is acceptable.

Figure 6:
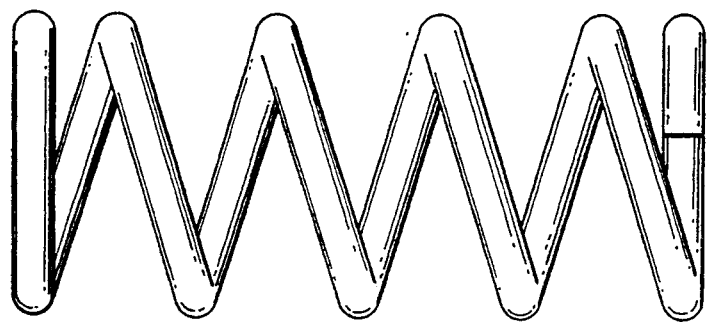
FIG. 6 is a schematic illustration of one type of article, e.g., a coil spring, that can be made from the structural element of this invention.

The structural element of this invention can be sawed, drilled, tapped, twisted, bent, and otherwise used to form useful articles of manufacture. For example, the element may be coiled into a helix to form a coil spring as shown in FIG. 6. If the structural element is made with a thermoplastic binder 12, a preformed straight length of element may be heated, coiled to the appropriate shape, and cooled to solidify the binder 12, and thereby produce a stable coil spring. Alternatively, the element may employ a thermoplastic molten binder 12 in casing 11, and the element may be coiled into a spring before the binder 12 is allowed to solidify. If the binder 12 is a thermosetting material, it is coiled before the binder material has had time to set to a solid, and the result is a stable coil spring. There are a multitude of applications for the structural element of this invention including ropes, rods, structural beams for chemical processing equipment, articles used under sea water, strands used in human surgical procedures, and the like.

In the process of tills invention as shown in FIGS. 7-9, a plug 17 is moved through the internal hollow of casing 11 with binder 12 and fiber reinforcement strands 13 filling the hollow behind the plug 17 as it moves along. In the process depicted in FIG. 7, a length of casing 11 is fitted with a feed funnel 16 into which is fed a continuous length of a plurality of strands 13 and at the same time is fed liquid or molten binder 12 from a supply reservoir 15. Plug 17 is slidable within casing 11 and has an eye 18 to which the hank of strands 13 is attached. A pull cable 19 is attached to the front of plug 17 to pull plug 17 through casing 11 by wind up drum 20. As plug 17 is moved downward toward drum 20, binder 13 fills the interior hollow of casing 11 and the individual strands in hank 13 disperse themselves throughout the entire cross section of the interior hollow of casing 11 to eventually approach the distribution shown in FIGS. 2-5. It can be appreciated that casing 11 and plug 17 may take any shape, such as those in FIGS. 2-5. Furthermore, hollow shapes may be made by making plug 17 into a tubular object sliding between inner casing 29 and outer casing 11. If preferred, inner casing may be supported by an internal mandrel to support inner casing against collapse until binder 12 hardens.

In FIG. 8 the same general arrangement as that of FIG. 7 is shown except that instead of a wind up drum 20 and a cable 19 to move plug 17 there is a vacuum pump 21 to produce a lower pressure in the space 25 ahead of plug 17 causing plug 17 to move toward vacuum pump 21.

In FIG. 9 there also is the same general arrangement of casing 11, plug 17 and strands 13, attached to eye 18. In this instance the force to move plug 17 through casing 11 is provided by the pressure on binder 12. Inlet pipe 22 feeds liquid binder 12 to pump 23 which pumps binder into pressure vessel 27 which has an outlet into casing 11. Roll 14 of fiber reinforcement strands 13 is mounted inside vessel 27 in a pressurized space 26 designed to offset the pressure on binder 12 emitted from pump 23. Binder 13 is supplied to space 24 under pressure and this bears against plug 17 causing it to move to the right and fill up casing 11.

In all of the embodiments of FIGS. 7, 8, and 9 the strands will be substantially linear and parallel to each other and to the longitudinal axis of casing 11 if plug 17 is simply pulled through casing 11. If plug 11 is rotated about its axis of travel as it is pulled through casing 11, strands 13 can be made into a sinuous or helical orientation while the individual strands 13 remain generally parallel with each other.

It is contemplated that in certain corrosive conditions there may be a need to completely insulate binder 12 and strands 13 from the surrounding corrosive medium. In such instances there may be end caps 28 sealed onto any cut ends of the structural element so as to leave only the material of the casing exposed as shown in FIG. 10. End cap 28 can be heat sealed or otherwise attached to casing 11 so as to be leak proof and therefore completely corrosion-resistant.

It is an important feature of this invention to provide elements in which the fiber reinforcing component is a continuous strand and not a plurality of chopped fibers. The continuous strands employed in this invention provide a greatly improved modulus of elasticity as compared to that of the strand containing short lengths of reinforcing fibers or filaments. It is for this reason that an excellent coil spring can be made from the structural element of this invention, while such a coil spring from the prior art would not be operable.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A non-extruded, rigid, elongated and solid composite structural element comprising an elongated and rigid core of plastic material, a plurality of elongated substantially continuous strands of fiber reinforcement material substantially parallel to each other, said strands extending lengthwise of and being embedded substantially uniformly throughout and filling said core, and a continuous elongated solid walled casing of a tubular rigid material around said core said core having an elongated hollow extending generally centrally thereof and generally parallel to said elongated casing.

2. The composite structural element of claim 1 wherein said casing is a corrosion resistant thermoplastic material.

3. The composite structural element of claim 1 wherein said fiber reinforcement material is an inorganic material.

4. The composite structural element of claim 1 wherein said fiber reinforcement material is a tubular filamentary material.

5. The composite structural element of claim 1 wherein said fiber reinforcement material is selected from the group consisting of fiberglass, carbon, graphite, bagasse, cotton, hemp, rayon, polyester, nylon, polyacrylonitrile, steel, copper, aluminum, titanium and magnesium.

6. The composite structural element of claim 1 wherein said element is an elongated coil spring, said spring being in a shape of a helical coil with said strands within said core and said casing being retained in said helical coil shape.

7. The composite structural element of claim 1 wherein said core and said wall casing have a substantially identical cross-sectional shape at any cross-section through both of said core and casing over their entire lengths.

8. The composite structural element of claim 1 wherein said plastic material is a thermosetting material.

9. The composite structural element of claim 1 wherein said element is a load-bearing structural beam, said beam being defined by said casing and said hollow core.

10. The composite structural element of claim 1 wherein said core and said casing are maintained in an unbonded condition.

11. The composite structural element of claim 1 wherein said plastic material is a thermoplastic material.

12. The composite structural element of claim 1 wherein said element after solidification of said core is adapted to be reheated from any external source and formed into another shape and thereafter cooled and solidified to such other shape.

13. The composite structural element of claim 1 further comprising a second continuous elongated solid walled casing of a tubular rigid material located and extending throughout said elongated hollow adjacent said core.

14. The composite structural element of claim 13 further comprising cap means on respective ends of said element for sealing said core within and between said casings and said cap means.

15. An elongated composite spring element comprising an elongated solid member having a helical configuration and a substantially identical cross sectional shape over its entire length, an elongated helical core of solidified rigid plastic material, a plurality of elongated substantially continuous strands of fiber reinforcement material substantially parallel to each other, said strands extending lengthwise of and being embedded substantially uniformly throughout and filling said core, and a continuous, elongated, helical, flexible and solid walled casing of a tubular material encapsulating said core, said core having an elongated helical hollow extending generally centrally thereof and generally parallel to said elongated casing.

16. The element of claim 15 wherein said plastic material is a thermoplastic material.

17. The element of claim 15 wherein said plastic material is a thermosetting material.

18. The element of claim 15 further comprising a second continuous, elongated, helical, flexible and solid walled casing of a tubular material extending throughout said helical hollow.

19. The element of claim 18 further comprising cap means on respective ends of said element for sealing said core within and between said casings and said cap means.

* * * * *